United States Patent [19]

Marlowe

[11] 4,261,022
[45] Apr. 7, 1981

[54] DATA EVALUATOR USING AN ADJUSTABLE ENDLESS LOOP MAGNETIC TAPE

[75] Inventor: Richard E. Marlowe, Pinole, Calif.

[73] Assignee: Automation Industries, Inc., Greenwich, Conn.

[21] Appl. No.: 21,533

[22] Filed: Mar. 19, 1979

[51] Int. Cl.³ .................. G11B 15/26; G11B 19/16; G11B 27/00
[52] U.S. Cl. ............................................. 360/90; 360/7
[58] Field of Search ............ 360/90, 7, 93, 137, 360/71, 109, 104, 6; 324/210, 216, 220–221, 225; 226/179–180, 189, 27–28; 346/33 M

[56] References Cited

U.S. PATENT DOCUMENTS

| 3,441,187 | 4/1969 | Tveter et al. | 360/90 |
| 3,674,923 | 7/1972 | Gifft | 226/180 |
| 3,718,772 | 2/1973 | Sanctuary | 360/7 |
| 3,757,058 | 9/1973 | Ingoldsby | 360/7 |
| 3,855,467 | 12/1974 | Chope | 360/7 |

FOREIGN PATENT DOCUMENTS

| 1126633 | 3/1960 | Fed. Rep. of Germany | 360/7 |
| 383023 | 12/1964 | Switzerland | 360/7 |

Primary Examiner—Alfred H. Eddleman
Attorney, Agent, or Firm—Francis N. Carten

[57] ABSTRACT

A data evaluator employing an endless loop which has the capability of eliminating a standard signal from a test signal so as to result in the depiction of an accurate defect signal. The data evaluator of the instant invention generally comprises two record and play back heads, an endless loop which travels an endless path across the opposed record and play back heads, and a synchronizing device employed to synchronize the signals which simultaneously are played across two opposed record and play back heads.

6 Claims, 1 Drawing Figure

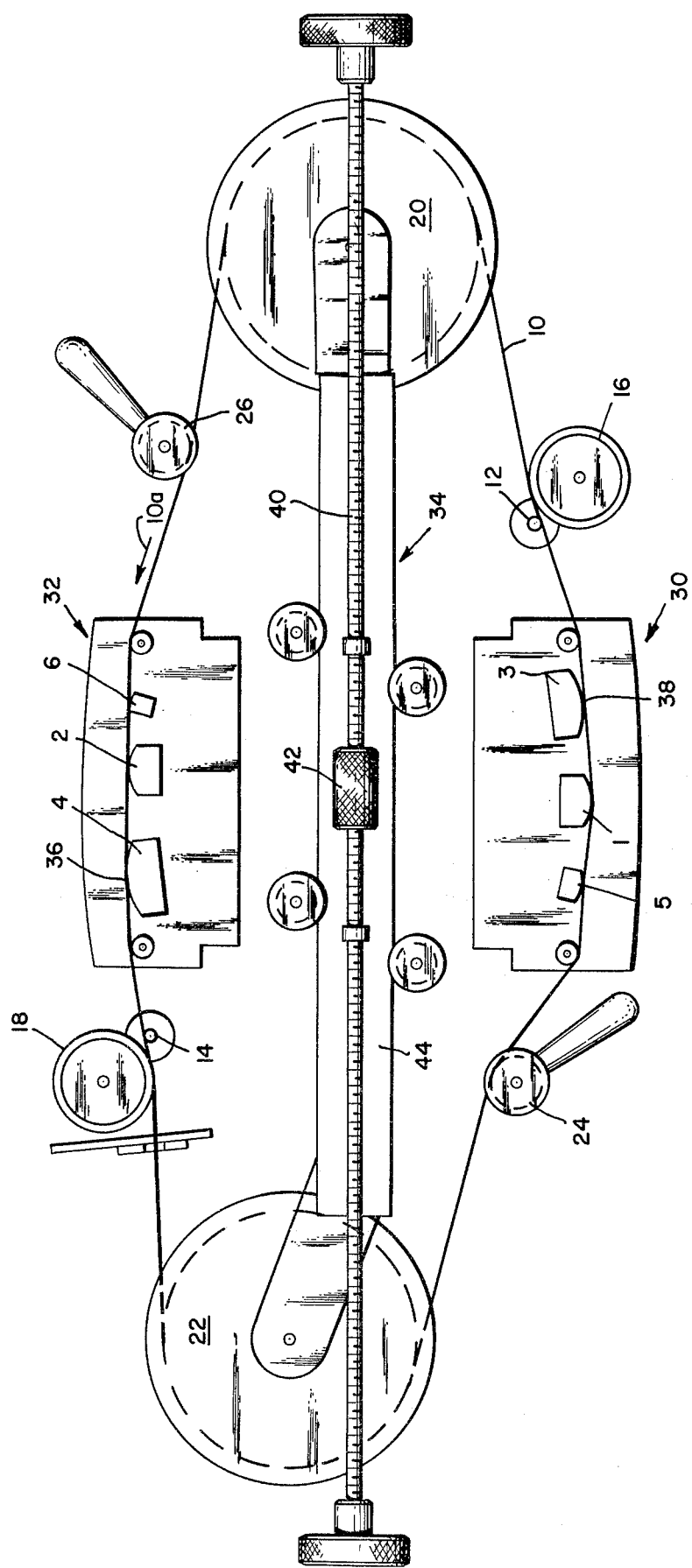

DATA EVALUATOR USING AN ADJUSTABLE ENDLESS LOOP MAGNETIC TAPE

PRIOR ART

This invention relates generally to signal rectification and correction apparatus and systems therefor and more specifically to a novel data evaluator system.

It is known to employ systems for inspecting steam generators utilizing eddy current probes to measure variations in the conductivity of the tube wall of the steam generating system.

An alternating voltage is impressed across two test coils, developing a magnetic field by virtue of the current flow in the test coils, thereby causing eddy currents to flow in the tube wall. A corresponding magnetic field caused by the eddy current flow in the tube wall is out of phase with the field developed by the current in the test coils. Since these fields tend to cancel one another, the coil voltage is decreased and phase shifted in proportion to the magnitude of the eddy currents in the test piece. Thus, the coil voltage is dependent on the electrical properties of the tubes being tested. The electrical properties which affect the flow of eddy currents are permeability and conductivity. In non-magnetic material such as Inconel and 300 Series Stainless Steel, conductivity is usually the only significant variable. When the conductivity increases due to a discontinuity in the tube wall, the coil voltage increases and phase shifts in direct relationship with the depth and volume of the conductivity change. Thus, the amount of increase in the coil voltage and the phase change is related to size of the discontinuity or defect in the tube wall.

The coil voltage is sinusoidal, thus it can be described with a single vector of a specific magnitude and phase. The eddy current test system employed in the steam generator inspection provides a method for reading out the two quadrature components of the test coils voltage vector.

The two test coils normally employed are electrically connected in opposite legs of the balancing network in the eddy current instrument. Thus, the tube is being inspected by the differential technique which decreases the effects of probe motion, temperature variations and geometry differences. It should be noted however that changes in nominal wall thickness are not detected so that this effect is not minimized or eliminated.

The signals thus obtained from such test devices are converted into usable forms so that they may be stored and recorded on magnetic tape and then analyzed by trained technicians in order to determine the location and character of defects in tubes, tube sheets and tube supports. It has been found that in order to properly determine the size, character and location of a defect, interfering factors such as the tube sheets and tube supports must be compensated for, since they will appear in the test data. More significantly, if a defect is found to occur at a tube sheet or a tube support, the size and character of such a defect might be masked unless the signal of the tube sheet and/or the tube support is effectively eliminated so that the defect signal can be accurately seen.

Prior art systems include very complicated and not well understood, but widely used, computer systems which are very expensive, very complicated, and very bulky, in order to subtract these tube supports and display or recognize accurately the defect signal.

OBJECTS

It is therefore an object of this invention to provide an uncomplicated data evaluator for use in flaw detection systems devoid of the above-noted deficiencies.

It is a further object of this invention to provide a novel eddy current flaw detection system.

Yet another object of this invention is to provide an inexpensive field adaptable data evaluator employing eddy current flaw detection principles.

Yet still another object of this invention is to provide a simple, inexpensive data evaluator system for use in eddy current flaw detection systems.

Again, another object of this invention is to provide a data evaluator system having the capability of employing the desired tube support signal for a specific application in order to accurately depict the defect signal.

Yet still another object of this invention is to provide a data evaluator which has the capability of eliminating tube support signals in order to accurately depict a defect signal.

These and other objects of the instant invention are accomplished generally speaking by providing a data evaluator employing an endless tape loop signal which has the capability of eliminating the desired tube support so as to result in an accurate defect signal. The data evaluator of the instant invention generally comprises two record and playback heads, an endless loop which travels an endless path across the opposed record and playback heads and a synchronizing device employed to synchronize the signals which simultaneously are played across the two opposed record and playback heads. In operation generally speaking, a conventional eddy current signal generated from a flaw detection device interrogating the tube system having tube supports enters a conventional eddy current apparatus, which converts the eddy current signal into horizontal and vertical voltage components. These components are then modulated to FM frequencies and recorded on magnetic tape. The magnetically recorded signal is then displayed on an oscilloscope and an operator observes the visual signal in order to detect flaws in the tube and tube support system. When such flaws are suspected to occur in the tube support system, thus producing an apparently distorted tube support signal, they are then recorded on a continuous magnetic tape loop in the data evaluator. Approximately in an opposed position to the recorded distorted tube support signal, a standard tube support signal is recorded. Then electronically the standard tube support signal is reversed so that it is in addition to being an approximately physically opposed position to the recorded, distorted tube support signal, it is now electronically opposed. The data evaluator is then energized, thus causing the endless belt loop to traverse an endless path across the two opposed record and playback heads. The signals thus generated are viewed on an oscilloscope and a synchronizing system is adjusted so that the two signals are synchronized. Thus, the electrically opposed tube support signal eliminates or cancels the tube support signal of the distorted tube support signal. A gating system is employed to specifically address the defect location so that only the defect signal visually appears on the oscilloscope screen, thus eliminating other portions of the tube support signal and the tube signal which does not contain defects but does contribute to the noise thus interfering with the defect signal.

The general characteristics of the data evaluator of the instant invention having been described, the specifics of the system of the instant invention will be more clearly understood with reference to the accompanying drawing, FIG. 1.

In FIG. 1 there are seen two opposed record heads generally designated as 1 and 2. Adjacent to each of the opposed record heads are two opposed playback heads, 3 and 4 and two erase heads, 5 and 6. An endless magnetic tape loop, 10, traverses an endless path which is counter-clockwise, 10a, past the opposed erase heads 5 and 6, the record heads 1 and 2 and the playback heads, 3 and 4. The tape is played through two drive capstans 12 and 14, two pinch rollers 16 and 18, oppose the two capstans 12 and 14, holding the magnetic tape 10 firmly against the capstans 12 and 14. Tape position rollers 20 and 22 define and adjust the path of the tape travel 10. Two idlers 24 and 26 are employed to apply the appropriate tension to the magnetic tape 10 in order to ensure proper contact with the head assemblies generally designated as 30 and 32. Synchronizer assembly generally designated as 34 is employed to physically synchronize a standard signal located at position 36 with a test signal located at position 38. The standard tube support signal located at position 36 has been electronically reversed so that it is simultaneously played across opposed playback head 4 with the distorted tube support signal located at position 38 on playback head 3 the tube support signal is eliminated, allowing the true defect signal to remain. This true defect signal is then demodulated and visually observed on an oscilloscope not shown to determine the defect depth.

The synchronizing mechanism 34 comprises a tape position adjusting screw 40 which drives the tape adjusting nut 42 attached to the tape adjusting slide 44. The tape adjusting slide is connected to the tape position roller 20 and 22 to physically move the rollers in order to position the magnetic tape so that a standard tube support signal in location 36 will be crossing the playback head 4 when the distorted tube support signal at position 38 crosses playback head 3.

Means are supplied in the data evaluator system which are not shown that allow the tube support signal to be varied in size and angle.

Any suitable eddy current apparatus may be employed in connection with the data evaluator system of the instant invention. These instruments generate eddy current signals in the test piece. Under test conditions, the eddy currents generated in the part affect the impedance of the coil by virtue of the discontinuities in the test piece or changes of the conductivity in the test piece. The impedance changes in the test coil are related to phase and amplitude signals which are displayed on the oscilloscope and are converted into dc voltage components in the horizontal and vertical direction. The vertical and horizontal components thus produced on the oscilloscope are directed to the FM tape recorder which converts the signals to frequencies corresponding to these voltage components, which are then recorded on the magnetic tape. The vertical and horizontal voltage components thus converted are recorded on two separate channels of the magnetic tape.

Any suitable vector analyzer oscilloscope may be employed in connection with the data evaluator of the instant invention. These conventionally available oscilloscopes as above recited are employed for operator observation of a test signal in order to detect and locate a distorted tube support signal, in addition to other defects in the tubes.

As recited above, when such a distorted tube support signal or tube sheet signal is located, this signal is then recorded on the endless belt loop of the data evaluator of the instant invention. As herein above described, the standard tube support signal or tube sheet signal is then subtracted from the distorted tube support signal or distorted tube sheet signal and the resulting accurate defect signal is then visually observed on the vector analyzer oscilloscope. The resulting phase angle is then measured in order to determine the depth of the defect.

Other additional elements may be employed, for example, a timing mechanism may be employed so that only the tube support or tube sheet sections are appropriately recorded on the data evaluator system of the instant invention and analyzed thereon. In addition, a meter system may also be employed which will visually indicate synchronization of the opposed standard signal and distorted test signal. Other elements may also be employed which will allow the level of the timing signal to be adjusted in addition to means provided for timing based on the vertical or combinations of vertical and horizontal voltage signals.

Other modifications and ramifications of the present invention will occur to those skilled in the art upon a reading of the foregoing specification. These are intended to be included within the scope of the invention which is only limited by the appended claims.

I claim:

1. A data evaluator system comprising:
   two opposed playback heads,
   an endless magnetic tape loop which traverses an endless path around said opposed playback heads having a standard signal recording position and a test signal recording position substantially physically opposed to each other, and
   a synchronizing mechanism which physically, simultaneously positions the standard signal recording position on one opposed playback head and the test signal recording position on the other playback head whereby said opposed playback heads simultaneously traverse said standard signal recording position and said test signal recording position.

2. The data evaluator as defined in claim 1 further including substantially adjacent to each said opposed playback head an erase head.

3. The data evaluator as defined in claim 2 further including substantially adjacent to each of said playback and erase heads a record head.

4. The data evaluator as defined in claim 2 wherein said synchronizing mechanism comprises a pair of opposed tape position rollers around which the endless magnetic tape travels, an adjusting nut which physically positions the tape position rollers and a tape position adjusting screw which drives said adjusting nut.

5. The data evaluator system as defined in claim 1 further including at least one set of capstan and pinch rollers through which said magnetic tape travels.

6. The data evaluator system as defined in claim 1 further including at least one idler which adjusts the tension of the magnetic tape.

* * * * *